US010963833B2

(12) United States Patent
Xiao

(10) Patent No.: US 10,963,833 B2
(45) Date of Patent: Mar. 30, 2021

(54) METHOD AND APPARATUS FOR PROCESSING LOGISTICS INFORMATION

(71) Applicant: CAINIAO SMART LOGISTICS HOLDING LIMITED, Grand Cayman (KY)

(72) Inventor: Lujuan Xiao, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 489 days.

(21) Appl. No.: 15/620,410

(22) Filed: Jun. 12, 2017

(65) Prior Publication Data

US 2017/0364861 A1    Dec. 21, 2017

(30) Foreign Application Priority Data

Jun. 17, 2016 (CN) .......................... 201610439605.X

(51) Int. Cl.
    *G06Q 10/08*    (2012.01)
    *G06F 40/174*   (2020.01)
    (Continued)

(52) U.S. Cl.
    CPC ....... *G06Q 10/0838* (2013.01); *G06F 40/174* (2020.01); *G06F 40/186* (2020.01)

(58) Field of Classification Search
    CPC . G06Q 10/0838; G06F 17/248; G06F 17/243; G06N 7/005; G06N 20/00; G06N 5/00; G06N 20/10; G05B 2219/21002
    (Continued)

(56) References Cited

U.S. PATENT DOCUMENTS 6,202,062 B1    3/2001   Cameron et al.
6,446,076 B1    9/2002   Burkey et al.
(Continued)

FOREIGN PATENT DOCUMENTS

CN    1208484 A    2/1999
CN    1739115 A    2/2006
(Continued)

OTHER PUBLICATIONS

Smith, Dan; Sukhahuta, Rattasit; Information Extraction Strategies for Thai Documents; Jan. 2001 (Year: 2001).*
(Continued)

*Primary Examiner* — George Chen
*Assistant Examiner* — Dione N. Simpson
(74) *Attorney, Agent, or Firm* — Sheppard Mullin Richter & Hampton LLP

(57) ABSTRACT

The present application provides a method for processing logistics information, so as to process original logistics information uploaded by a logistics system into logistics information of a standardized format. Firstly, according to a logistics state indicated by logistics information, an information presentation template containing multiple information items is determined and logistics presentation information corresponding to each information item is determined, and the logistics presentation information is filled into the information presentation template to obtain standardized logistics information to be presented to a user, where the standardized logistics information better meets the requirement of the degree of attention from the user on the logistics information, and is easier for the user to read, so the user experience is good. Besides, the present application also provides an apparatus for processing logistics information, to ensure the application and implementation of the method in practice.

12 Claims, 7 Drawing Sheets

(51) Int. Cl.
*G06F 40/186* (2020.01)
*G06Q 30/06* (2012.01)
*G06Q 50/28* (2012.01)

(58) Field of Classification Search
USPC .......................................................... 705/341
See application file for complete search history.

(56) References Cited

U.S. PATENT DOCUMENTS

| | | |
|---|---|---|
| 6,453,315 B1 | 9/2002 | Weissman |
| 6,484,155 B1 | 11/2002 | Kiss |
| 6,519,578 B1 | 2/2003 | Reddy |
| 6,564,209 B1 | 5/2003 | Dempski |
| 6,618,504 B1 | 9/2003 | Yoshino |
| 6,711,585 B1 | 3/2004 | Copperman |
| 7,013,290 B2 | 3/2006 | Ananian |
| 7,548,881 B2 | 6/2009 | Narayan et al. |
| 7,647,288 B2 | 1/2010 | Friedlander et al. |
| 7,827,120 B1 | 11/2010 | Evans |
| 7,912,810 B2 | 3/2011 | Wittmann |
| 8,041,616 B2 | 10/2011 | Cullen, III et al. |
| 8,190,465 B2 | 5/2012 | Lokowandt et al. |
| 8,838,668 B2 | 9/2014 | Eisner et al. |
| 8,849,667 B2 | 9/2014 | Ben-Ezra |
| 8,935,420 B2 | 1/2015 | Bouazizi |
| 9,172,738 B1 | 10/2015 | daCosta |
| 2002/0124109 A1 | 9/2002 | Brown |
| 2002/0188515 A1 | 12/2002 | Nakata et al. |
| 2003/0028451 A1* | 2/2003 | Ananian ............... G06Q 30/02 705/26.42 |
| 2003/0061044 A1 | 3/2003 | Miyazawa |
| 2003/0061081 A1 | 3/2003 | Kellond et al. |
| 2004/0260470 A1 | 12/2004 | Rast |
| 2005/0060647 A1 | 3/2005 | Doan |
| 2005/0075894 A1 | 4/2005 | Bushey |
| 2005/0187769 A1 | 8/2005 | Hwang et al. |
| 2006/0085449 A1 | 4/2006 | Sattler |
| 2006/0184429 A1 | 8/2006 | Oschmann |
| 2006/0293911 A1 | 12/2006 | Wittmann |
| 2007/0016565 A1 | 1/2007 | Evans |
| 2007/0047718 A1 | 3/2007 | Idler |
| 2008/0126157 A1 | 5/2008 | Rousso et al. |
| 2008/0270449 A1 | 10/2008 | Gossweiler |
| 2009/0089254 A1 | 4/2009 | von Kaenel |
| 2010/0100818 A1 | 4/2010 | Yang |
| 2010/0185443 A1 | 7/2010 | Bushey |
| 2011/0238407 A1 | 9/2011 | Kent |
| 2012/0191716 A1 | 7/2012 | Omoigui |
| 2012/0271850 A1* | 10/2012 | Licata Messana ..... G06Q 10/08 707/779 |
| 2015/0161254 A1 | 6/2015 | Boswell |
| 2015/0302852 A1 | 10/2015 | Lu et al. |
| 2016/0005090 A1 | 1/2016 | Vollenweider |
| 2019/0087490 A1* | 3/2019 | Liu .................. G06F 16/00 |

FOREIGN PATENT DOCUMENTS

| | | | |
|---|---|---|---|
| CN | 102360463 A | | 2/2012 |
| CN | 102880947 A | | 1/2013 |
| CN | 103632251 A | | 3/2014 |
| CN | 104484790 A | | 4/2015 |
| CN | 105243129 B | | 10/2018 |
| JP | 200478953 | * | 3/2004 |
| JP | 2004-78953 A | * | 11/2004 |
| JP | 3922894 B2 | | 5/2007 |
| RU | 2429537 C2 | | 9/2011 |
| WO | WO-2017101728 A1 | * | 6/2017 ............. G06N 5/048 |

OTHER PUBLICATIONS

International Search Report and Written Opinion for PCT/US2017/037033, dated Aug. 4, 2017.
Examination Report No. 1 dated Jun. 14, 2019, issued in related Australian Application No. 2017286545 (3 pages).
PCT International Preliminary Report on Patentability dated Dec. 27, 2018, issued in related International Application No. PCT/US2017/037033 (7 pages).
Examination Report No. 2 dated Feb. 26, 2020, issued in related Australian Application No. 2017286545 (6 pages).
First Search dated Dec. 25, 2019, issued in related Chinese Application No. 201610439605.X (2 pages).
First Office Action dated Jan. 2, 2020, issued in related Chinese Application No. 201610439605.X, with English machine translation (15 pages).

* cited by examiner

| | | | |
|---|---|---|---|
| 2016-03-03 | Thursday | 12:30:46 | Shipped by the seller |
| | | 19:12:08 | Picked up and scanned at Zhejiang Yuyao Company |
| | | 20:16:33 | Scanned for next stop in Zhejiang Yuyao Company, and to be sent to: Zhejiang Hangzhou Service Point |
| | | 22:54:41 | Weighed and scanned at Zhejiang Ningbo Distribution Center |
| | | 22:59:48 | Scanned before loading at Zhejiang Ningbo Distribution Center, and to be sent to: Zhejiang Hangzhou Distribution Center |
| 2016-03-04 | Friday | 05:34:45 | Scanned after unloading at Zhejiang Hangzhou Distribution Center |
| | | 05:36:38 | Arrived at Zhejiang Hangzhou Distribution Center |
| | | 05:41:15 | Arrived at Zhejiang Hangzhou Distribution Center |
| | | 05:45:03 | Scanned for set package at Zhejiang Hangzhou Distribution Center, and to be sent to: Zhejiang Hangzhou Xihu Wenjiao Company |
| | | 05:49:40 | Departed from Zhejiang Hangzhou Distribution Center, and transferred to Zhejiang Hangzhou Xihu Wenjiao Company |
| | | 11:20:06 | Arrived at the destination service point, Zhejiang Hangzhou Xihu Wenjiao Company, and to be delivered |
| | | 15:14:45 | Scanned before delivery at Zhejiang Hangzhou Xihu Wenjiao Company; dispatcher: Luo Xiangping; phone: 11111111 |
| | | 17:47:35 | Scanned after being received with signature at Zhejiang Hangzhou Xihu Wenjiao Company. The package has been photographed (your package has been received with signature, thank you for choosing YUNDA Express!) and signed for. |

FIG. 1 (Prior Art)

| Date | Day | Time | Event |
|---|---|---|---|
| 2016-03-03 | Thursday | 12:30:46 | The seller is contacting the express company for pickup |
| | | 19:12:08 | [Ningbo City] Picked up by the collector from Zhejiang Yuyao Company of YUNDA Express |
| | | 20:16:33 | [Ningbo City] Departed from Zhejiang Yuyao Company |
| | | 22:54:41 | [Ningbo City] Arrived at Zhejiang Ningbo Transfer Center |
| | | 22:59:48 | [Ningbo City] Departed from Zhejiang Ningbo Transfer Center |
| 2016-03-04 | Friday | 05:34:45 | [Jiaxing City] Arrived at Zhejiang Hangzhou Transfer Center |
| | | 05:49:40 | [Jiaxing City] Departed from Zhejiang Hangzhou Transfer Center |
| | | 11:20:06 | Arrived at the destination service point, Zhejiang Hangzhou Xihu Wenjiao Company, and to be delivered |
| | | 15:14:45 | [Hangzhou City] In route for delivery by dispatcher: Luo Xiangping 11111111 at Zhejiang Hangzhou Xihu Wenjiao Company |
| | | 17:47:35 | [Hangzhou City] Scanned after being received with signature at Zhejiang Hangzhou Xihu Wenjiao Company. The package has been photographed (your package has been received with signature, thank you for choosing YUNDA Express!) and signed for. Thank you for choosing YUNDA Express, and look forward to serving you next time. |

FIG. 3

| 2015-Aug-25 | Tues. | 15:51:01 | [China] Accepted by the consolidation hub |
| | | 15:51:35 | [China] Warehoused successfully |
| | | 15:24:15 | [China] The seller is contacting the express company for pickup |
| | | 15:50:00 | [China] [Wuhu City] Picked up by the collector from Wuhu Transfer Center of SF Express |
| | | 15:50:36 | [China] In route for delivery |
| | | 15:51:01 | [Consolidation] Accepted by the consolidation hub |
| | | 15:51:35 | [Consolidation] Warehoused successfully |
| | | 15:59:18 | [Overseas] Warehouse delivery confirmed |
| | | 16:07:50 | [Overseas] Clearance anomaly |

FIG. 6

METHOD AND APPARATUS FOR PROCESSING LOGISTICS INFORMATION

CROSS REFERENCE TO RELATED APPLICATION

The present application is based on and claims the benefit of priority to Chinese Application No. 201610439605.X, filed on Jun. 17, 2016, the entire contents of which are incorporated herein by reference.

TECHNICAL FIELD

The present application relates to the technical field of logistics management, and in particular, to a method and apparatus for processing logistics information.

BACKGROUND

Items purchased by users on e-commerce platforms generally need to be delivered by logistics companies to the places of the buyers. The logistics companies set up logistics systems to manage the item transportation process. The logistics systems can generate and store logistics information during the whole process, available for query by the users.

Currently, as shown in FIG. 1, the presented logistics information is a statement consisting of logistics states, locations of goods and so on. The logistics information in this form is not intuitive and not concise, and is inconvenient for the users to read, so the user experience is poor.

SUMMARY

In view of the above, the present application provides a method for processing logistics information, to solve the technical problem that the generated logistics information in the prior art is inconvenient for users to read and the user experience is poor. Besides, the present application also provides an apparatus for processing logistics information, to ensure the application and implementation of the method in practice.

To achieve the above objective, the present application provides the following technical solutions:

In a first aspect of the present application, a method for processing logistics information is provided, which includes:

acquiring logistics information;

determining a corresponding logistics information presentation template for the logistics information;

filling the logistics information into the logistics information presentation template, to obtain standardized logistics information.

In a second aspect of the present application, a method for processing logistics information is provided, which includes:

acquiring multiple pieces of logistics information;

screening to obtain target logistics information belonging to logistics nodes from the multiple pieces of logistics information;

determining a corresponding logistics information presentation template for the target logistics information;

filling the target logistics information into the logistics information presentation template, to obtain standardized logistics information.

In a third aspect of the present application, an apparatus for processing logistics information is provided, which includes:

a logistics information acquiring unit, for acquiring logistics information;

a presentation template determining unit, for determining a corresponding logistics information presentation template for the logistics information;

a standardization processing unit, for filling the logistics information into the logistics information presentation template, to obtain standardized logistics information.

In a fourth aspect of the present application, an apparatus for processing logistics information is provided, which includes:

a logistics information acquiring unit, for acquiring multiple pieces of logistics information;

a logistics information screening unit, for screening to obtain target logistics information belonging to logistics nodes from the multiple pieces of logistics information;

a presentation template determining unit, for determining a corresponding logistics information presentation template for the target logistics information;

a standardization processing unit, for filling the target logistics information into the logistics information presentation template, to obtain standardized logistics information.

It can be seen from the above technical solutions that, the present application provides a method for processing logistics information, which includes: after acquiring logistics information, determining a corresponding logistics information presentation template for the logistics information, the logistics information presentation template containing content in the logistics information, that a user is interested in, and the logistics information presentation template having a preset format; and filling the logistics information into the logistics information presentation template, to obtain standardized logistics information. The logistics information better meets the reading habit of a user on logistics information, so the user experience is good.

BRIEF DESCRIPTION OF THE DRAWINGS

To illustrate the technical solutions according to the embodiments of the present application or in the prior art more clearly, the accompanying drawings required for describing the embodiments or the prior art are introduced briefly in the following. Apparently, the accompanying drawings in the following description are only the embodiments of the present application, and persons of ordinary skill in the art can derive other drawings from the accompanying drawings without creative efforts.

FIG. 1 is a diagram illustrating an example of logistics information presented to a user in the prior art;

FIG. 3 is a diagram illustrating an example of standardized logistics information generated after processing of the logistics information shown in FIG. 1;

FIG. 6 is a diagram illustrating an example of logistics information after standardization of logistics information in a cross-border logistics scenario according to the present application;

DETAILED DESCRIPTION

The technical solutions in the embodiments of the present application will be clearly and fully described in the following with reference to the accompanying drawings. It is obvious that the embodiments to be described are only a part rather than all of the embodiments of the present application. All other embodiments obtained by persons of ordinary skill in the art based on the embodiments of the present application without any creative efforts shall fall within the protection scope of the present application.

For ease of understanding, an application scenario of the present application is introduced first.

Figure 2:
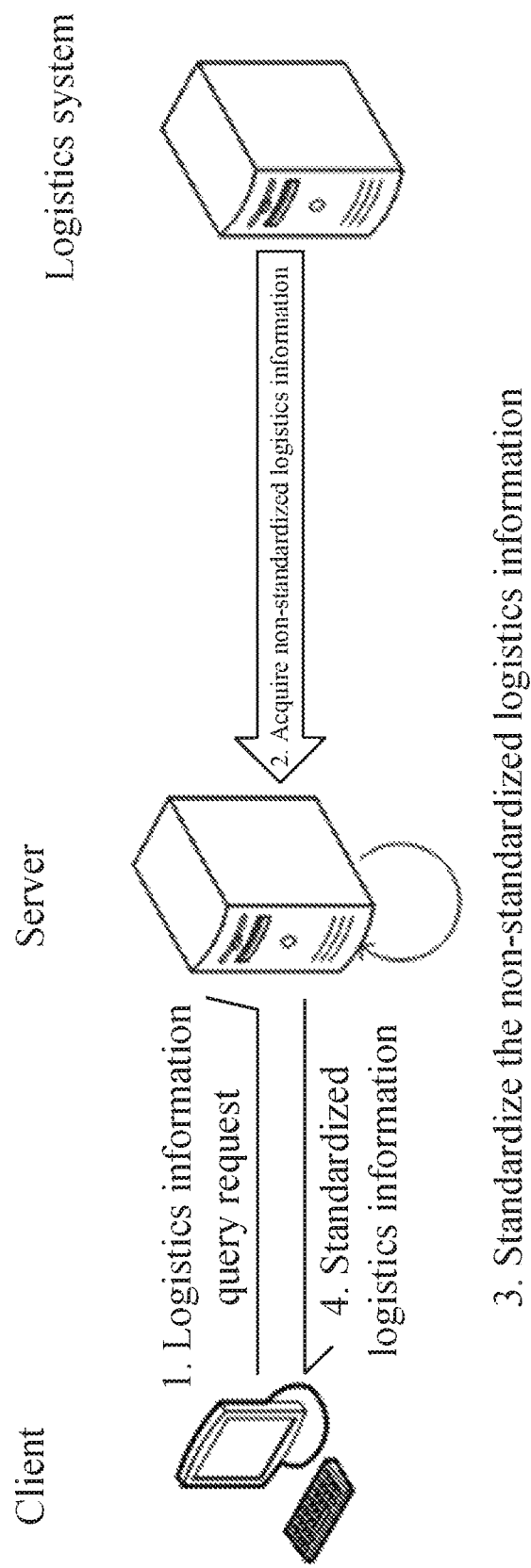
FIG. 2 is a schematic diagram of an application scenario of a method for processing logistics information according to the present application.

As shown in FIG. 2, after purchasing an item on an e-commerce website, a user may send a request for querying logistics information through a client. A server of the e-commerce website receives the logistics query request, and then acquires logistics information from a logistics system, where the logistics information may be referred to as non-standardized logistics information.

The server performs standardization processing on the non-standardized logistics information, and returns standardized logistics information to the client. For example, the logistics information shown in FIG. 1 is converted into standardized logistics information shown in FIG. 3. The server may include one or more processors coupled to computer-readable storage medium, e.g., memory. The memory stores instructions (e.g., program codes). The one or more processors are configured to execute the instructions to cause the server to perform the methods described in this disclosure.

The method for processing logistics information according to the present application may be applied on a server, to convert non-standardized logistics information into logistics information of a standardized format, which is convenient for users to read.

Figure 4:
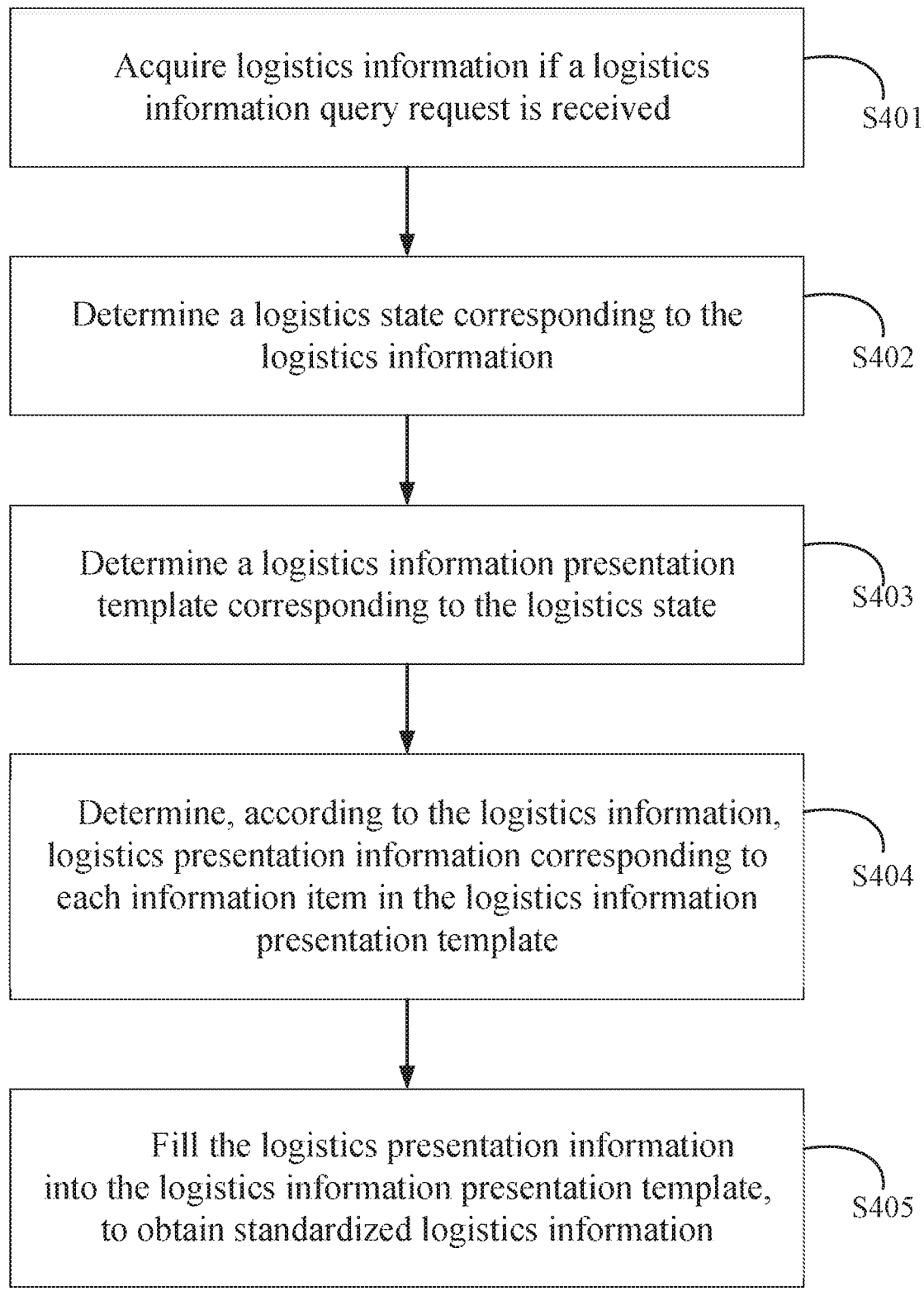
FIG. 4 is a flow chart of a method for processing logistics information according to the present application.

FIG. 4 shows the flow of a method for processing logistics information, which includes Steps S401-S405 as follows.

Step S401: Acquire logistics information if a logistics information query request is received.

A user may log on to an e-commerce platform to query logistics information of an item.

A logistics system stores logistics information of items, and the logistics information may be referred to as original logistics information in order to distinguish from standardized logistics information. A server of the e-commerce platform receives a logistics information query request for an item from a user, and then acquires the original logistics information of the item from the logistics system.

The server of the e-commerce platform may also perform a standardization process of Steps S402-S405 on the original logistics information after the logistics system uploads the original logistics information. However, in this way, the e-commerce platform needs to store both of the original logistics information and the standardized logistics information in a magnetic disk. The standardized logistics information is stored and thus can be presented to a user when the user queries the logistics information.

Because the e-commerce platform needs to process logistics information of a large number of items, the above manner may consume a great amount of storage resources, and is impractical. Therefore, the standardization process can be performed after the logistics information query request from the user is received. The standardized logistics information may be directly displayed to the user, instead of being stored in a magnetic disk, thereby saving the storage resources.

Step S402: Determine a logistics state corresponding to the logistics information.

Before implementation, multiple logistics states are preset. The logistics states represent logistics states of items at different stages in the whole logistics process, including: shipped, picked up, arrived at a logistics service point, handled by the logistics service point, sent out from the logistics service point, in route for delivery, received with signature, etc.

Other logistics states may be set according to actual presentation requirements, or, one or some logistics states are omitted, for example, the logistics state of being handled by the logistics service point is omitted.

Optionally, a corresponding logistics state is determined for each piece of logistics information.

Step S403: Determine a logistics information presentation template corresponding to the logistics state.

The logistics information presentation template (or information presentation template for short) contains information items of different types, and limits the display manner of each information item.

Before implementation, a corresponding logistics information presentation template may be set for each logistics state. After a logistics state corresponding to a piece of logistics information is determined, a corresponding information presentation template may be determined for the logistics information according to the logistics state.

To provide intuitive reading experience for a user, the information presentation template contains multiple information items, and different information items represent logistics information of different content types.

For example, the logistics state may be any one of being picked up, arriving at a logistics service point, sent out from the logistics service point, in route for delivery, and received with signature, where:

the information presentation template corresponding to the logistics state of being picked up is:

{regional address} Picked up by a collector {courier} from {name of the logistics company};

the information presentation template corresponding to the logistics state of arriving at a logistics service point is:

{regional address} Package arrived at {address of the logistics service point};

the information presentation template corresponding to the logistics state of being sent out from the logistics service point is:

{regional address} Left from {address of the logistics service point};

the information presentation template corresponding to the logistics state of being in route for delivery is:

{regional address} In route for delivery by dispatcher: {courier} {phone} from {name of the logistics company};

the information presentation template corresponding to the logistics state of being received with signature is:

{regional address} {signed copy}, thank you for choosing {name of the logistics company}, look forward to serving you next time.

The contents in brackets are information items, the specific contents of the information items need to be filled in information presentation templates according to logistics information, and the contents outside the braces are built-in texts in the templates.

The present application limits the display manner of each information item, and may limit the display order and the display form of each information item. For example, according to the actual requirement, a user is interested in the regional address of an item; therefore, the information item of regional address may be arranged at the beginning, and may be set in a display form different from other information items. For example, the display form may be set in different display colors, or adding format symbols like [ ].

For example, in an information presentation template of a piece of logistics information, if the content of the information item of regional address is Ningbo City, the display form may be [Ningbo City].

In view of the above, Step S402 and Step S403 are performed to determine a corresponding logistics information presentation template for logistics information. However, it should be noted that, the manner of determining a logistics information presentation template for logistics information is not limited to the manner shown in Step S402 and Step S403, and other manners may also be adopted.

Step S404: Determine, according to the logistics information, logistics presentation information corresponding to each information item in the logistics information presentation template.

The logistics presentation information is the content corresponding to an information item. Taking the above example for instance, the content "Ningbo City" in the information item of regional address is logistics presentation information corresponding to the regional address.

The determining manner may be, searching the logistics information for the content corresponding to each information item, and if not found, determining the logistics presentation information according to the type of each information item.

For example, if the logistics information is: "being scanned before delivery at Zhejiang Hangzhou Xihu Wenjiao Company; dispatcher: Zhang San; phone: 1337683****", the information presentation template corresponding to the logistics state of being in route for delivery is: {regional address} {name of the logistics company} dispatcher: in route for delivery by {courier} {phone}.

The above information presentation template includes four information items, and the logistics presentation information of the last three information items may be found in the logistics information. For example, the name of the logistics company is "Zhejiang Hangzhou Xihu Wenjiao Company", and the courier is "Zhang San" with the phone number "1337683****"; therefore, the logistics presentation information corresponding to the three information items can be directly obtained.

The information item of regional address cannot be directly acquired from logistics records, and needs to be acquired in other manners, for example, by searching for the address related to the name of the logistics company using a map application, the found address being the regional address.

Step S405: Fill the logistics presentation information in the logistics information presentation template, to obtain standardized logistics information.

Step S404 is performed to determine the logistics presentation information corresponding to each information item in the information presentation template, and Step S405 is performed to fill each piece of the logistics presentation information in the logistics information presentation template, to realize standardization processing of the original logistics information.

In view of the above, Step S404 and Step S405 are performed to fill the logistics information into the logistics information presentation template, to obtain standardized logistics information. However, the manner of filling the logistics information into the logistics information presentation template is not limited to the above manner, and other manners may also be adopted.

The standardized logistics information may be returned and displayed to a user, and is more convenient for the user to read.

It can be seen from the above technical solution that, this embodiment provides a method for processing logistics information, so as to process original logistics information in a logistics system into logistics information of a standardized format. Firstly, according to a logistics state corresponding to logistics information, an information presentation template containing multiple information items is determined and logistics presentation information corresponding to each information item is determined, and the logistics presentation information is filled into the information presentation template to obtain standardized logistics information to be presented to a user, where the standardized logistics information better meets the requirement of the degree of attention from the user on the logistics information, so the user experience is better.

In the implementation, the specific implementation manner of determining the logistics state corresponding to the logistics information in Step S402 may include Steps A1-A3 as follows.

Step A1: Extract a word segment of a preset part-of-speech from the logistics information.

The extracted word segment is configured to describe the logistics state of an item, and thus the extracted word segment may be referred to as a target logistics state word.

The word segmentation operation is performed on the logistics information by using the word segmentation technology, to obtain multiple word segments. Each word segment has its part-of-speech, such as adjective, verb, and noun. It is found through studies that, word segments of some parts-of-speech, such as verb and adjective, may represent the logistics state of an item.

For example, in the logistics information of being picked up by a collector "Key Client" in "Jiangxi Yingtan Yujiang Company", "picked up" is a verb phrase indicating that the logistics state of the item is being picked up.

Therefore, word segments of some preset parts-of-speech are extracted from the logistics information after the word segmentation operation is performed. For example, after the word segmentation operation is performed on the third line of the logistics information "scanned for next stop in Zhejiang Yuyao Company, and to be sent to: Zhejiang Hangzhou Service Point" in FIG. 1, the verb phrases "scanned for next stop" and "to be sent to" are extracted.

Step A2: Obtain multiple logistics state probabilities of the word segment, the logistics state probabilities representing the possibilities that the word segment corresponds to the logistics states.

Before implementation, a large number of state words/phrases may be collected in advance to generate a state word library, which may be referred to as a preset state word library. State word samples are trained by using a classification probability algorithm such as a naive Bayes classification algorithm, to obtain a classification probability model. The classification probability model may be used to calculate the probability that the state word is in each logistics state.

For example, there are five logistics states, namely, picked up, arriving at a logistics service point, sent out from the logistics service point, in route for delivery, and received with signature, and the probability that the state word "to be sent to" corresponds to each logistics state is calculated by using the classification probability model.

If the word segment is contained in the state word library, the classification probability model may be used to calculate multiple logistics state probabilities for the word segment. Therefore, the calculated logistics state probabilities are directly obtained.

Step A3: Determine the logistics state corresponding to a maximum value of the logistics state probabilities as the logistics state of the logistics information.

The logistics state probabilities of the word segment may vary, and the probability of the logistics state that the word segment actually corresponds to is the maximum value among the logistics state probabilities.

Therefore, the maximum value of the logistics state probabilities is selected. The logistics state corresponding to the maximum value is determined as the logistics state of the logistics information.

For example, the target logistics state word extracted from the logistics information "scanned for next stop in Zhejiang Yuyao Company, and to be sent to: Zhejiang Hangzhou Service Point" is "to be sent to", and the probabilities that the target logistics state word "to be sent to" corresponds to the logistics states of being picked up, arriving at a logistics service point, sent out from the logistics service point, in route for delivery, and received with signature are respectively 0.1, 0.1, 0.6, 0.1, and 0.1, which are calculated by using the classification probability model, where the logistics state corresponding to the maximum value 0.6 is "being sent out from the logistics service point", so that the logistics state of the logistics information is: sent out from the logistics service point.

If multiple word segments are extracted in Step A1, two processing manners may be adopted. The first processing manner is to select one word segment from the word segments and perform Step A2. The second processing manner is to perform Step A2 and Step A3 on each word segment, determine whether the logistics states corresponding to the maximum logistics state probabilities of the word segments are the same, and if all the logistics states are the same or a number of logistics states exceeding a preset value are the same, determine this logistics state as the logistics state of the logistics information.

In the actual application, a piece of key logistics information that a user is interested in is the location address of the delivery item. However, the original logistics information usually does not contain address information, and address information of an item needs to be determined according to other contents in the logistics information.

Therefore, the implementation manner of determining the logistics presentation information corresponding to an information item in the logistics information presentation template in Step S404 may include Step B1 and Step B2 as follows.

Step B1: Determine a logistics service point where an item is located from the logistics information.

Generally, the logistics information uploaded by a logistics system contains the name of a logistics service point, so that a logistics service point where a target item is located may be extracted from the logistics information.

For example, if the logistics information is "scanned in Zhejiang Yuyao Company for the next delivery stop, and to be sent to: Zhejiang Hangzhou Service Point", the logistics service point determined from the logistics information is "Zhejiang Yuyao Company".

Step B2: Determine the regional address of the logistics service point as the address item in the logistics presentation information.

A map application may be invoked through a query interface provided by the map application to search for the address of the logistics service point, and the found address is determined as the address item in the logistics presentation information, that is, the content corresponding to the information item of regional address in the logistics presentation template.

For example, the address of the logistics service point "Zhejiang Yuyao Company" is Ningbo City, and thus Ningbo City is the address item.

In the actual application, the address may be categorized by administrative division, and determined to an administrative region, for example, a city. The address may be further determined to a smaller administrative region, for example, a county or district.

Through Step B1 and Step B2, when the regional address cannot be extracted from the logistics information, the regional address of the logistics information may be determined by using the logistics service point.

The third line of the logistics information "scanned for next stop in Zhejiang Yuyao Company, and to be sent to: Zhejiang Hangzhou Service Point" in FIG. 1 is used as an example below to illustrate the standardization of the logistics information.

Firstly, the word segmentation operation is performed on the logistics information, a target logistics state word "to be sent to" is extracted, and logistics state probabilities corresponding to the target logistics state word are determined by using the classification probability model. The logistics state "sent out from the logistics service point" corresponding to the maximum logistics state probability is determined as the target logistics state of the logistics information.

Then, the information presentation template corresponding to the target logistics state "sent out from the logistics service point" is determined as: left from {regional address}{address of the logistics service point}. It can be seen from the above that, the information presentation template comprises two information items, namely, regional address and address of the logistics service point.

The logistics presentation information corresponding to the information item "address of the logistics service point" is determined. The logistics service point extracted from the logistics information is "Zhejiang Yuyao Company", and thus "Zhejiang Yuyao Company" may be determined as the logistics presentation information of the address of the logistics service point.

The logistics presentation information corresponding to the information item "regional address" is determined. A map application is invoked to query and find that the address of the logistics service point "Zhejiang Yuyao Company" is "Ningbo City", and thus "Ningbo City" is determined as the logistics presentation information of the regional address. To make it convenient for a user to view the content of the item of regional address, character-prompting square brackets [ ] are used in the information presentation template to mark and prompt the content of the regional address.

Finally, the logistics presentation information "Zhejiang Yuyao Company" and "Ningbo City" are filled into the corresponding information items in the information presentation template, and standardized logistics information is obtained as follows:

[Ningbo City] Left from Zhejiang Yuyao Company.

Each piece of the logistics information in FIG. 1 is standardized in the above manner, and the standardized logistics information to be presented to a user as shown in FIG. 3 is obtained.

In an actual application, it is possible that the logistics states of multiple pieces of logistics information in one logistics service point are the same; therefore, after the logistics information is filled into the logistics information presentation template, the same standardized logistics information is obtained.

For example, in the logistics information shown in FIG. 1, the first piece of the logistics information, the second piece of the logistics information, and the third piece of the logistics information all of which correspond to Friday are generated at Zhejiang Hangzhou Distribution Center, and the corresponding logistics states are all "arriving at the logistics service point".

After the three pieces of the logistics information are filled into the logistics information presentation template, the same standardized logistics information is obtained, that is: [Jiaxing City] Package arrived at Zhejiang Hangzhou Transfer Center.

Therefore, a deduplication operation needs to be performed on the repeated standardized logistics information, that is, only one copy of the same standardized logistics information is kept, and the standardized logistics information with the earliest logistics time is kept.

To solve the technical problem of the repeated standardized logistics information, the following method for processing logistics information may be used.

Figure 5:
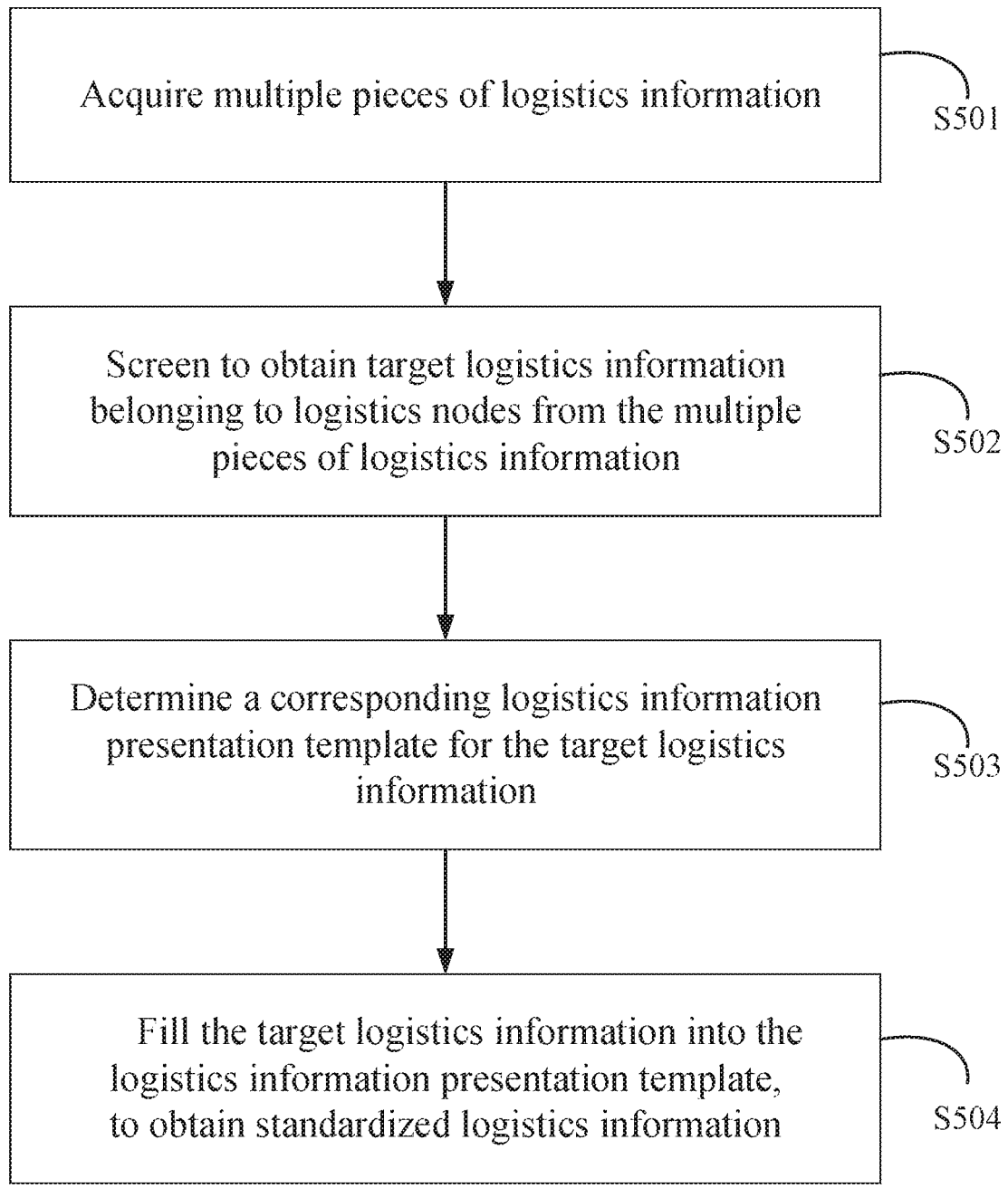
FIG. 5 is a flow chart of a method for processing logistics information according to the present application.

As shown in FIG. 5, Embodiment 2 of a method for processing logistics information according to the present application may include Steps S501-S504. The differences between Embodiment 2 and Embodiment 1 of the method for processing logistics information are described below, and details about the same content are not repeatedly described herein.

Step S501: Acquire multiple pieces of logistics information.

Step S502: Screen to obtain target logistics information belonging to logistics nodes from the multiple pieces of logistics information.

The logistics nodes may be distinguished according to logistics states of the logistics information.

As for the logistics information corresponding to one-time logistics states including being shipped, picked up, in route for delivery, and received with signature, the logistics nodes are the logistics states of the logistics information.

As for the logistics information corresponding to the logistics states including arriving at a logistics service point and sent out from the logistics service point, the logistics nodes are the logistics state of the logistics information of arriving at a logistics service point and the logistics state of the logistics information of being sent out from the logistics service point.

For example, in the logistics information shown in FIG. 1, the logistics service points corresponding to the first piece to the fifth piece of the logistics information all of which correspond to Friday are Zhejiang Hangzhou Distribution Center, where the first piece of the logistics information is the logistics information of arriving at the logistics service point, and the fifth piece of the logistics information is the logistics information of being sent out from the logistics service point. Therefore, the target logistics information belonging to the logistics nodes and obtained by screening from the five pieces of the logistics information includes the first piece and the fifth piece of the logistics information.

This step may be performed in the following manner:

determining a logistics state corresponding to each piece of the logistics information;

determining logistics information corresponding to the same logistics service point in the multiple pieces of logistics information as one logistics information group; as for each logistics information group, screening to obtain the target logistics information belonging to the logistics nodes, according to the logistics states of the logistics information in the logistics information group.

The logistics information is grouped according to the logistics service point, and the logistics information in each logistics information group is processed separately. According to the logistics states of the logistics information in each logistics information group, the first logistics state indicating arriving at a logistics service point is obtained by screening, and the last logistics state indicating being sent out from the logistics service point is obtained by screening. The logistics information corresponding to the logistics states obtained from the screening is the logistics information belonging to the logistics nodes.

For the one-time logistics state, the first logistics state indicating arriving at a logistics service point and the last logistics state indicating being sent out from the logistics service point are the same.

Step S503: Determine a corresponding logistics information presentation template for the target logistics information.

The logistics state may be determined for the target logistics information, and as for the determining manner, reference may be made to Embodiment 1 of the method for processing logistics information. Therefore, the logistics information presentation template corresponding to the logistics state is determined according to the logistics state of the target logistics information.

Step S504: Fill the target logistics information into the logistics information presentation template, to obtain standardized logistics information.

In the method for processing logistics information provided by this embodiment, the logistics information belonging to the logistics node may be first obtained by screening, and the logistics information with the same logistics state is deduplicated in the logistics information obtained by the screening; therefore, the standardized logistics information obtained after the logistics information is filled into the logistics information presentation template has no duplicate information, so that more concise logistics information is presented to a user, and the user experience is better.

Besides, time disorder of multiple pieces of the same logistics information may occur in the implementation. Some logistics states may appear only once, such as being picked up, in route for delivery, and received with signature. For ease of description, such logistics states may be referred to as one-time logistics states.

For example, a piece of logistics information of being in route for delivery exists in the logistics information, while another piece of logistics information of being in route for delivery is generated after a user signs for the package. In this case, the repeated logistics information needs to be processed.

The logistics state is determined for each piece of the logistics information, and if the determined multiple logistics states contain multiple identical one-time logistics states, the logistics state corresponding to the earliest logistics information needs to be selected from the multiple logistics states, and the information presentation template is determined for the selected logistics state.

Besides, when the logistics presentation information of each information item in the information presentation template is determined according to the logistics information, the earliest logistics information uploaded by the logistics system may be selected from the logistics information corresponding to the multiple one-time logistics states, and the logistics presentation information corresponding to each information item is determined according to the selected logistics information. Reference may be made to the description of Step S404 for the determining method, and the details are not repeatedly described herein.

For example, the logistics system uploads the logistics information of being in route for delivery at 13:15, uploads the logistics information of being received with signature at 14:00, and uploads the logistics information of being in route for delivery once again at 16:00. After the information presentation template is selected for the target logistics state of being in route for delivery, the logistics information uploaded earlier, that is, the logistics information uploaded at 13:15 is selected from the two pieces of logistics information of being in route for delivery, and the logistics presentation information is extracted from the logistics information.

In an actual application, cross-border logistics may occur, that is, a target item (item for short) may be transported from one country or district into another country or district. In a cross-border logistics scenario, the Customs need to inspect the target item, and thus the logistics information contains logistics information in two countries or districts as well as related clearance information.

In this application scenario, the information presentation template of the target item includes a cross-border logistics information presentation template, and the cross-border logistics information presentation template contains all the cross-border logistics links, that is, cross-border link items. Each cross-border link item represents the cross-border logistics link of the target item when the logistics system uploads the logistics information. FIG. 6 shows an example of logistics information generated after standardization of logistics information in a cross-border logistics scenario. As shown in FIG. 6, the cross-border link items contained in the standardized logistics information are "China", "consolidation", and "overseas".

In the process of generating the standardized logistics information, the implementation manner of determining the logistics presentation information corresponding to each information item according to the logistics information in Step S404 may include Step C1 and Step C2 as follows.

Step C1: Extract cross-border terms indicating cross-border logistics states from the logistics information.

An information presentation template may be determined for the logistics information in the domestic stage by using the above manner, and the logistics presentation information is filled into the information presentation template for standardization, for example, the fourth line of the standardized logistics information in FIG. 6.

Cross-border link items need to be added in the case of cross-border logistics. If it is shipped from China, the logistics presentation information corresponding to the cross-border link item in the domestic logistics stage is "China".

After entering the next stage of the domestic logistics stage, the logistics information uploaded by the logistics system may be "Accepted by the consolidation hub" as shown in FIG. 6, and thus cross-border terms indicating the cross-border states such as "consolidation hub" and "accepted by" may be extracted from this piece of the logistics information.

Step C2: Determine a cross-border link item in the cross-border logistics information presentation template according to the cross-border terms.

Because the cross-border logistics state indicated by the cross-border terms is unique, the cross-border link item corresponding to the cross-border terms may be determined according to the cross-border terms.

For example, the cross-border link item corresponding to the cross-border terms "consolidation hub" and "accepted by" is the "consolidation" stage, and the logistics presentation information "consolidation" can be determined according to this group of cross-border terms.

For example, the cross-border link item corresponding to the cross-border terms "consolidation hub" and "departed" is the "overseas" stage, and the logistics presentation information "overseas" can be determined according to this group of cross-border terms.

The cross-border link item of each stage of domestic transportation and clearance is described above. If the clearance is successful, after entering the overseas transportation stage, the logistics link item of the logistics information uploaded by the logistics system may be "overseas" or others. If the uploaded logistics information is not in Chinese, the logistics information may be translated into Chinese and then the logistics presentation information of each information item is determined in the above manner of determining the information presentation template, so as to perform standardization processing on the logistics information in the overseas transportation stage. The logistics information after standardization processing is similar to the fourth line of the logistics information in FIG. 6, and comprises the logistics presentation information of each information item.

An apparatus for processing logistics information according to the present application is described below.

Figure 7:
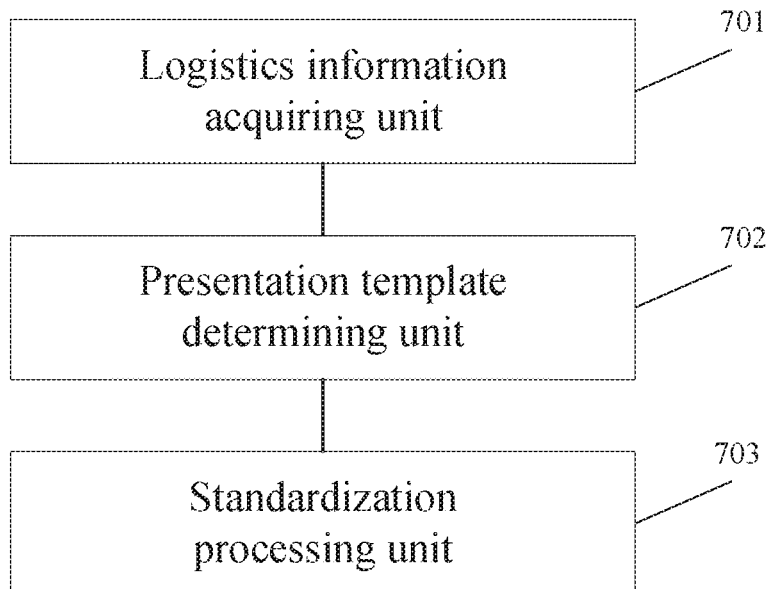
FIG. 7 is a schematic structural diagram of an apparatus for processing logistics information according to the present application.

FIG. 7 shows the structure of Embodiment 1 of an apparatus for processing logistics information according to the present application. As shown in FIG. 7, the apparatus may include: a logistics information acquiring unit 701, a presentation template determining unit 702, and a standardization processing unit 703, where the logistics information acquiring unit 701 is configured to acquire logistics information;

the presentation template determining unit 702 is configured to determine a corresponding logistics information presentation template for the logistics information;

the standardization processing unit 703 is configured to fill the logistics information into the logistics information presentation template, to obtain standardized logistics information.

In the step of determining a corresponding logistics information presentation template for the logistics information, the presentation template determining unit 702 is configured to:

determine a logistics state corresponding to the logistics information; and determine a logistics information presentation template corresponding to the logistics state.

In the step of determining a logistics state of the logistics information, the presentation template determining unit 702 is configured to:

extract a word segment of a preset part-of-speech from the logistics information;

obtain multiple logistics state probabilities of the word segment, the logistics state probabilities representing the possibilities that the word segment corresponds to the logistics states; and determine the logistics state corresponding to a maximum value of the logistics state probabilities as the logistics state of the logistics information.

The logistics state probabilities of the word segment are generated in advance; correspondingly, the apparatus may further include a logistics state probability generating unit, for generating the logistics state probabilities of the word segment.

In the aspect of generating the logistics state probabilities of the word segment, the logistics state probability generating unit is configured to:

determine multiple logistics state probabilities of state words in a preset state word library by using a pre-trained classification probability model, the state words in the preset state word library including the word segment.

Besides, the apparatus for processing logistics information may further include: a deduplication unit, for, after the logistics information is filled into the logistics information presentation template to obtain standardized logistics information, if same standardized logistics information is obtained, performing deduplication operation on the repeated standardized logistics information.

Figure 8:
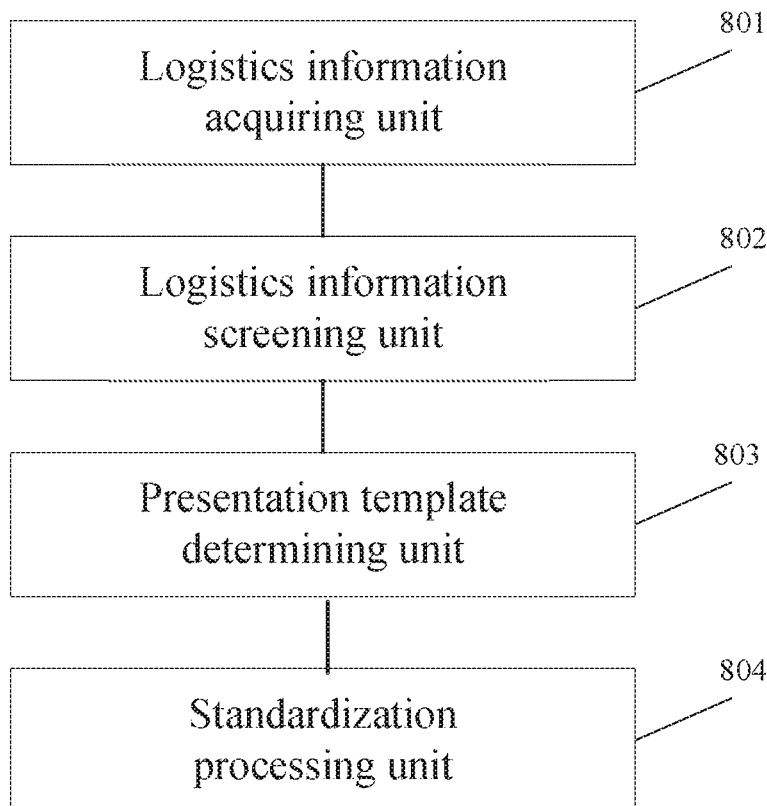
FIG. 8 is a schematic structural diagram of an apparatus for processing logistics information according to the present application.

FIG. 8 shows the structure of Embodiment 2 of an apparatus for processing logistics information according to the present application. As shown in FIG. 8, the apparatus may include: a logistics information acquiring unit 801, a logistics information screening unit 802, a presentation template determining unit 803, and a standardization processing unit 804, where the logistics information acquiring unit 801 is configured to acquire multiple pieces of logistics information;

the logistics information screening unit 802 is configured to screen to obtain target logistics information belonging to logistics nodes from the multiple pieces of logistics information;

the presentation template determining unit 803 is configured to determine a corresponding logistics information presentation template for the target logistics information;

the standardization processing unit 804 is configured to fill the target logistics information into the logistics information presentation template, to obtain standardized logistics information.

In the step of screening to obtain target logistics information belonging to logistics nodes from the multiple pieces of logistics information, the logistics information screening unit 802 is configured to:

determine a logistics state corresponding to each piece of the logistics information;

determine logistics information corresponding to the same logistics service point in the multiple pieces of logistics information as one logistics information group;

as for each logistics information group, screen to obtain the target logistics information belonging to the logistics nodes, according to the logistics states of the logistics information in the logistics information group.

In the step of determining a corresponding logistics information presentation template for the target logistics information, the presentation template determining unit 803 is configured to:

determine a logistics information presentation template according to the logistics state of the target logistics information.

All the embodiments in this specification are described in a progressive manner, each embodiment focuses on the differences from the other embodiments, and reference may be made to each other for the same or similar parts of the embodiments.

Relational terms such as first and second herein are merely used for distinguishing an entity or operation from another entity or operation, and do not necessarily require or imply that these entities or operations have any of such real relationships or orders. Besides, the terms "include", "contain" or any other variations are intended to cover non-exclusive inclusions, so as to cause a process, method, commodity or device including a series of elements to not only include those elements, but also include other elements that are not listed specifically, or also include elements that are inherent in this process, method, commodity or device. Therefore, the element defined by a sentence "including a . . . " does not preclude the presence of other identical elements in the process, method, commodity or device including the elements under the condition of no more limitations.

A person skilled in the art can understand that, various exemplary logic blocks, units, modules, circuits, and algorithm steps described herein may be implemented as specialized electronic hardware, computer software, or a combination of electronic hardware and computer software. For examples, the steps and modules/units may be performed or implemented by one or more processors executing software instructions stored in the computer-readable storage medium to perform the specialized functions of the steps and modules/units.

The flowcharts and block diagrams in the accompanying drawings show system architectures, functions, and operations of possible implementations of the system and method according to multiple embodiments of the present invention. Each block in the flowchart or block diagram may represent one module/unit, one program segment, or a part of code, where the module/unit, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

Embodiments of the present disclosure may take the form of a computer program product embodied in one or more tangible and/or non-transitory computer-readable storage media containing computer-readable instructions (e.g., program codes). The computer-readable instructions, when executed by one or more processors, cause the one or more processors to implement the steps and units/modules disclosed in the disclosure. The computer-readable storage medium may include volatile or non-volatile, magnetic, semiconductor, optical, removable, non-removable, or other types of computer-readable storage medium or computer-readable storage devices. Common forms of non-transitory computer-readable storage medium include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computer-readable instructions may also be loaded onto a computer device (for example, a personal computer (PC), a server, a mobile device (e.g., smart phone), or a tablet device) and when the computer device executes the computer-readable instructions, for example, by one or more processors of the computer device, the computer device performs a series of operational steps/functions to implement the methods, functions, and units/modules illustrated and described in the flow diagrams and/or the block diagrams in this disclosure. In a typical configuration, a computer device includes one or more processors, an input/output interface, a network interface, and a memory. The memory may include any form of storage medium as discussed above. The memory can store the computer-readable instructions that can be executed by the processor in the computer.

Persons skilled in the art can implement or use the present application according to the description of the disclosed embodiments. It is apparent to persons skilled in the art that various modifications can be made to these embodiments, and general principles defined in this specification may be implemented in other embodiments without departing from the spirit or scope of the present application. Therefore, the present application is not limited by the embodiments described herein, but has the broadest scope conforming to the principles and innovative features disclosed by this specification.

What is claimed is:

1. A computer-implemented method for processing logistics information, implementable by a computer device comprising one or more processors and one or more non-transitory computer-readable memories coupled to the one or more processors and configured with instructions executable by the one or more processors, the method comprising:
   acquiring, by the computer device, logistics information;
   extracting, by the computer device, two or more word segments from the logistics information;
   for each of the two or more word segments, determining, by the computer device, a plurality of logistics state probabilities of the word segment corresponding to a plurality of logistics states using a pre-trained classification probability model, determining, by the computer device, a maximum logistics state probability of the word segment from the plurality of logistics state probabilities, and identifying, by the computer device, a logistics state corresponding to the maximum logistics state probability as the logistics state of the word segment;
   determining, by the computer device among the logistics states of the two or more word segments, whether a preset number of logistics states are identical;
   in response to determining that the preset number of logistics states are identical, determining, by the computer device, a logistics state of the logistics information as the identical logistics state;
   determining, by the computer device, a logistics information presentation template for the logistics information based on the logistics state of the logistics information;
   determining, by the computer device, logistics presentation information corresponding to items in the logistics information presentation template based on the logistics information; and
   filling, by the computer device, the logistics presentation information into the logistics information presentation template, to obtain standardized logistics information.

2. The method for processing logistics information according to claim 1, wherein for each of the two or more word segments, determining, by the computer device, a plurality of logistics state probabilities of the word segment corresponding to a plurality of logistics states using a pre-trained classification probability model comprises:
   determining multiple logistics state probabilities of state words in a preset state word library by using the pre-trained classification probability model, the state words in the preset state word library comprising the word segment.

3. The method for processing logistics information according to claim 1, after filling, by the computer device, the logistics presentation information into the logistics information presentation template, to obtain standardized logistics information, further comprising:
   in response to that same standardized logistics information is obtained, performing deduplication operation on the repeated standardized logistics information.

4. A method for processing logistics information, implementable by a computer device comprising one or more processors and one or more non-transitory computer-readable memories coupled to the one or more processors and configured with instructions executable by the one or more processors, the method comprising:
   acquiring, by the computer device, multiple pieces of logistics information;
   for each of the multiple pieces of logistics information:
       extracting, by the computer device, two or more word segments from the logistics information;
       for each of the two or more word segments, determining, by the computer device, a plurality of logistics state probabilities of the word segment corresponding to a plurality of logistics states using a pre-trained classification probability model, determining, by the computer device, a maximum logistics state probability of the word segment from the plurality of logistics state probabilities, and identifying, by the computer device, a logistics state corresponding to the maximum logistics state probability as the logistics state of the word segment;
       determining, by the computer device among the logistics states of the two or more word segments, whether a preset number of logistics states are identical; and
       in response to determining that the preset number of logistics states are identical, determining, by the computer device, a logistics state of the logistics information as the identical logistics state;
   screening, by the computer device, to obtain target logistics information belonging to logistics nodes from the multiple pieces of logistics information based on the logistics states of the multiple pieces of logistics information;
   determining, by the computer device, a logistics information presentation template for the target logistics information;
   determining, by the computer device, target logistics presentation information corresponding to items in the logistics information presentation template based on the target logistics information; and filling, by the computer device, the target logistics presentation information into the logistics information presentation template to obtain standardized logistics information.

5. The method for processing logistics information according to claim 4, wherein the screening, by the computer device, to obtain the target logistics information belonging to the logistics nodes from the multiple pieces of logistics information based on the logistics states of the multiple pieces of logistics information comprises:

determining logistics information corresponding to a same logistics service point in the multiple pieces of logistics information as one logistics information group; and for each of the logistics information group, screening to obtain the target logistics information belonging to the logistics nodes, according to the logistics states of the logistics information in the logistics information group.

6. The method for processing logistics information according to claim 5, wherein the determining, by the computer device, the logistics information presentation template for the target logistics information comprises:

determining the logistics information presentation template according to the logistics state of the target logistics information.

7. An apparatus for processing logistics information, comprising one or more processors and one or more non-transitory computer-readable memories coupled to the one or more processors and configured with instructions executable by the one or more processors to cause the apparatus to perform operations comprising:

acquiring logistics information;

extracting two or more word segments from the logistics information;

for each of the two or more word segments, determining a plurality of logistics state probabilities of the word segment corresponding to a plurality of logistics states using a pre-trained classification probability model, determining a maximum logistics state probability of the word segment from the plurality of logistics state probabilities, and identifying, by the computer device, a logistics state corresponding to the maximum logistics state probability as the logistics state of the word segment;

determining, by the computer device among the logistics states of the two or more word segments, whether a preset number of logistics states are identical;

in response to determining that the preset number of logistics states are identical, determining, by the computer device, a logistics state of the logistics information as the identical logistics state;

determining a logistics information presentation template for the logistics information based on the logistics state of the logistics information;

determining logistics presentation information corresponding to items in the logistics information presentation template based on the logistics information; and filling the logistics presentation information into the logistics information presentation template, to obtain standardized logistics information.

8. The apparatus for processing logistics information according to claim 7, wherein for each of the two or more word segments, determining a plurality of logistics state probabilities of the word segment corresponding to a plurality of logistics states using a pre-trained classification probability model comprises:

determining multiple logistics state probabilities of state words in a preset state word library by using the pre-trained classification probability model; wherein the state words in the preset state word library comprise the word segment.

9. The apparatus for processing logistics information according to claim 7, wherein the operations further comprise:

after the logistics presentation information is filled into the logistics information presentation template to obtain standardized logistics information, in response to that same standardized logistics information is obtained, performing deduplication operation on the repeated standardized logistics information.

10. An apparatus for processing logistics information, comprising one or more processors and one or more non-transitory computer-readable memories coupled to the one or more processors and configured with instructions executable by the one or more processors to cause the apparatus to perform operations comprising:

acquiring multiple pieces of logistics information;

for each of the multiple pieces of logistics information:
extracting two or more word segments from the logistics information;

for each of the two or more word segments, determining a plurality of logistics state probabilities of the word segment corresponding to a plurality of logistics states using a pre-trained classification probability model, determining a maximum logistics state probability of the word segment from the plurality of logistics state probabilities, and identifying, by the computer device, a logistics state corresponding to the maximum logistics state probability as the logistics state of the word segment;

determining, by the computer device among the logistics states of the two or more word segments, whether a preset number of logistics states are identical; and in response to determining that the preset number of logistics states are identical, determining, by the computer device, a logistics state of the logistics information as the identical logistics state;

screening to obtain target logistics information belonging to logistics nodes from the multiple pieces of logistics information based on the logistics states of the multiple pieces of logistics information;

determining a logistics information presentation template for the target logistics information;

determining logistics presentation information corresponding to items in the logistics information presentation template based on the target logistics information; and filling the target logistics presentation information into the logistics information presentation template to obtain standardized logistics information.

11. The apparatus for processing logistics information according to claim 10, wherein screening to obtain the target logistics information belonging to the logistics nodes from the multiple pieces of logistics information based on the logistics states of the multiple pieces of logistics information comprises:

determining logistics information corresponding to the same logistics service point in the multiple pieces of logistics information as one logistics information group; and for each of the logistics information group, screening to obtain the target logistics information belonging to the logistics nodes, according to the logistics states of the logistics information in the logistics information group.

12. The apparatus for processing logistics information according to claim 11, wherein determining the logistics information presentation template for the target logistics information comprises:

determining the logistics information presentation template according to the logistics state of the target logistics information.

* * * * *